Sept. 19, 1961        E. O. RICHTER        3,001,191

HEIGHT FINDING RADIO DETECTION AND RANGING DEVICE

Filed March 28, 1955        4 Sheets-Sheet 2

INVENTOR.
ELVIN O. RICHTER
BY
*George C. Sullivan*
Agent

Sept. 19, 1961 E. O. RICHTER 3,001,191
HEIGHT FINDING RADIO DETECTION AND RANGING DEVICE
Filed March 28, 1955 4 Sheets-Sheet 3

INVENTOR.
ELVIN O. RICHTER
BY
George C. Sullivan
Agent

Sept. 19, 1961     E. O. RICHTER     3,001,191
HEIGHT FINDING RADIO DETECTION AND RANGING DEVICE
Filed March 28, 1955     4 Sheets-Sheet 4

INVENTOR.
ELVIN O. RICHTER
BY
Agent

United States Patent Office 3,001,191
Patented Sept. 19, 1961

3,001,191
HEIGHT FINDING RADIO DETECTION AND
RANGING DEVICE
Elvin O. Richter, San Fernando, Calif., assignor to Lockheed Aircraft Corporation, Burbank, Calif.
Filed Mar. 28, 1955, Ser. No. 497,067
10 Claims. (Cl. 343—10)

This invention relates to airborne radio detection and ranging devices of the radar type adapted to provide relative position information of a remote target by the reflection of electromagnetic energy and more particularly to a device for accurately determining the height and relative azimuth position of a remote object at long range utilizing the earth as a reflecting surface for propagating energy reflected by the remote object along two distinct paths. One energy path is on a direct line of sight to the remote object and the other energy path is derived by utilizing the earth's surface as a reflector. By comparing the electromagnetic energy reflected from the remote object along the two distinct paths the altitude of the remote object may be readily determined.

Conventional radar devices for determining the relative position of a remote object in space necessarily employ a highly directive antenna to transmit and receive the electromagnetic energy which serves as the object detection medium. This is so because the object azimuth and elevation position information is derived by measuring the angular aiming direction of the antenna relative to established reference axes at the same time the electromagnetic energy is reflected by the object. The wider the beam pattern the less accurate the radar device will be in indicating the relative position of the object since the radar device cannot determine the azimuth and elevation position of the object within the beam; it can only determine the angular position of the beam centerline. For example, if a beam pattern having a 30° flare is employed, the object may be as much as 15° off the beam centerline and still be within the beam pattern. This would result in a 15° angular error in the position information obtained by the radar device. In order to minimize this source for error in search type radar equipment, a highly directive antenna is customarily employed which will confine the radiated energy within a very narrow beam width.

The use of a highly directive antenna makes it necessary to swing the antenna in both azimuth and elevation in order to search even a reasonably small sector of space. This requires a rather complex mechanical supporting mechanism for the antenna which, because of manufacturing tolerances, unavoidably introduces additional aiming errors into the radar system, making it practically impossible to obtain reliable data particularly as to objects at long range.

While the angular errors in the conventional radar device might be tolerable for locating objects at the shorter ranges, as the operating range of the device is increased, the angular errors produce errors in the azimuth and elevation position information which are of considerable magnitude. For example, an angular error in elevation of only 2° for an object at a range of 100 miles will result in an elevation error of 18,400 feet.

A primary object of this invention is to provide a radar device which is capable of accurately measuring the height of a remote object at long range as well as the relative azimuth position thereof with the use on an antenna which is highly directive in only one coordinate direction whereby a large sector of space may be searched at the same time the detected objects are being located in space. The shape of the energy beam as determined by the antenna directional characteristics, should properly be as narrow as possible in the azimuth or horizontal direction relative to the earth's surface and sufficiently wide in the elevation or vertical direction so that all altitudes at which the radar device is to operate, a portion of the energy will be reflected by the earth's surface. This results in approximately doubling the radar range and provides relatively strong return pulses for making a height determination.

Another object of this invention is to provide a radar device for accurately determining the height of a remote object by operating upon the reflected electromagnetic energy whereby target altitude may be determined without relying upon the instantaneous angular positions of the transmitting antenna relative to reference axes. Thus, mechanical tolerances of the antenna system do not affect the accuracy of the height determination.

Another object of this invention is to provide a radar device which requires antenna movement in only one plane for simultaneously searching a large sector of space and determining the location of a remote object within the search pattern whereby the antenna mounting structure may be greatly simplified as compared with the antenna mounting structure of conventional radar devices.

Another object of this invention is to provide a radar device which is dependable in operation and which is not readily susceptible to electronic countermeasure devices for determining when the position of the remote object is being ascertained. Thus, the remote object will not be likely to take evasive action before close range investigations thereof may be effected with reconnaissance or attack aircraft directed to the scene.

Another object of this invention is to provide a radar device for accurately determining the altitude of a remote object at long range without requiring the radar device to direct energy to the remote object for long periods of time.

Still another object of this invention is to provide a radar device capable of simultaneously searching a large sector of space and determining the position of an object within the search sector. Heretofore these operations were carried out independently and normally required the use of two separate radar devices because of the conventional methods of locating an object after its presence has been detected.

Further and other objects will become apparent from a reading of the following detailed description, especially when considered in combination with the accompanying drawing wherein like numerals refer to like parts.

Figure 1:
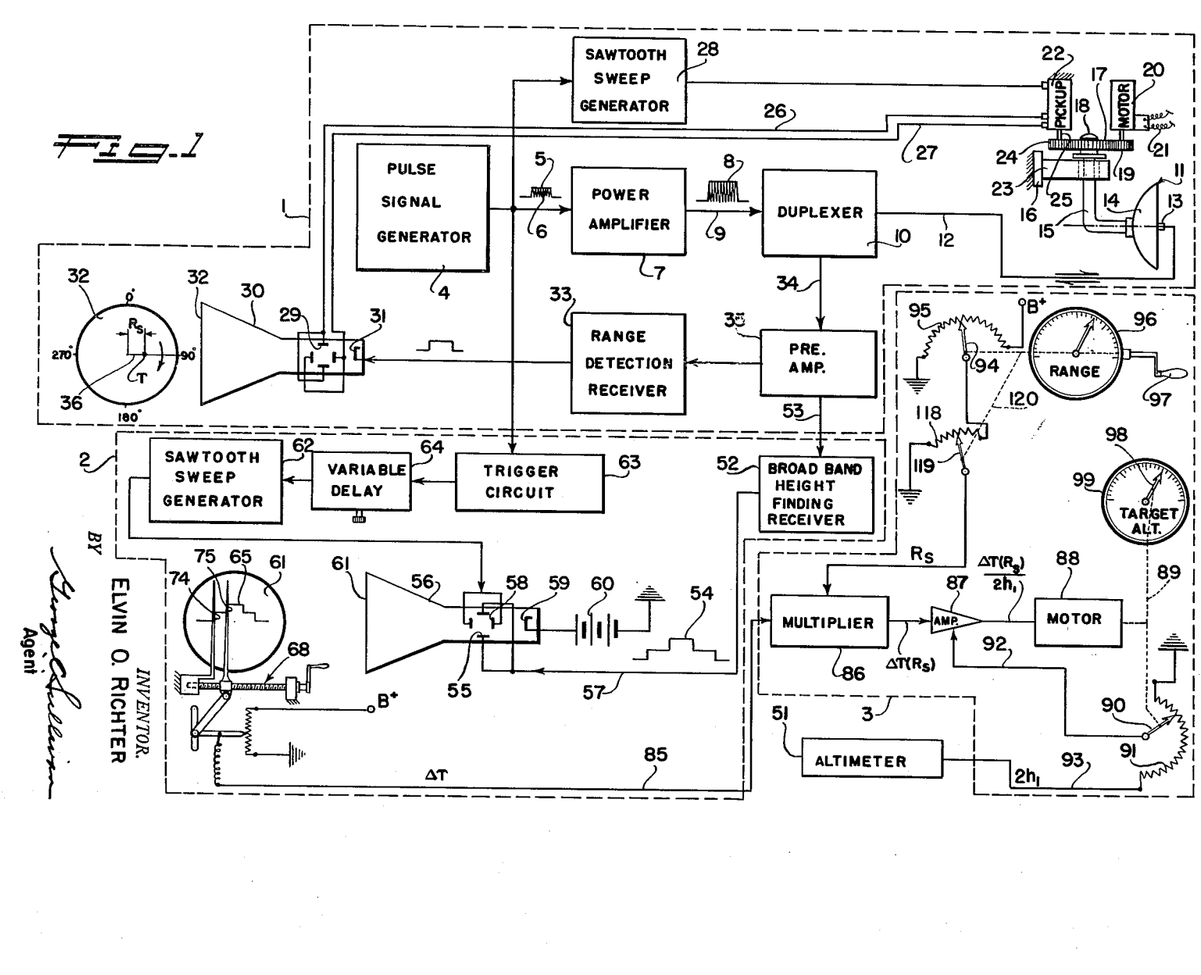
FIGURE 1 is a schematic block diagram of the height finding radar device of this invention.

Referring to FIGURE 1 it is seen that the height finding radar device of this invention includes a basic radio detection and ranging unit 1, a delta range detection unit 2, an altimeter 51 and a computer 3. The computer is responsive to the delta range detection unit 2, the basic radar unit 1 and the altimeter device 51 for computing the altitude of a remote object located within the search field of the radar device.

The basic radar unit as shown in FIGURE 1 includes a conventional pulse signal generator 4 which produces a continuous series of spaced energy pulses 5 made up of radio frequency waves 6 of the desired fixed frequency say, 400 megacycles per second. The series of pulses 5 from signal generator 4 are applied to a power amplifier 7 where the pulse energy level is increased to the desired transmitting power level as indicated by the increase in amplitude of the power amplifier output pulse 8. The power amplifier output 9 is applied to a duplexer 10 which directs the energy to an antenna 11 through suitable conductive means as represented by lead 12. Antenna 11 may be of the conventional dish type reflector 14 wherein the transmitted pulses are applied to the reflector through a feed 13 in such manner as to cause the energy to be reflected off the concave surface thereof whereby the transmitted energy is emitted in a particular direction relative to the antenna.

Figure 3:
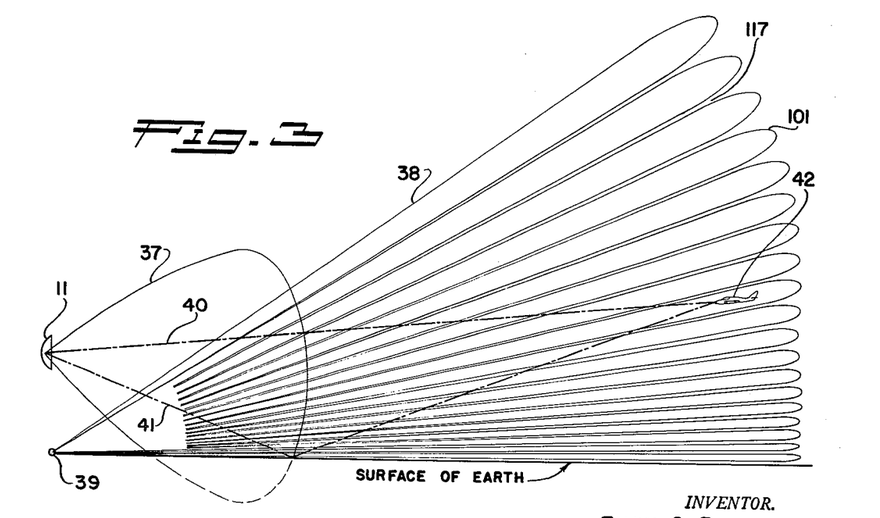
FIGURE 3 is a presentation of the free space beam pattern produced by the height finding device.

In order to search a large sector of space it is standard practice to move the radar antenna in a suitable systematic manner whereby the transmitted energy beam such as that illustrated in FIGURE 3 will sweep a selected sector of space to be investigated. The height finding radar device of this invention is intended to function in a similar manner as schematically illustrated in FIGURE 1. Antenna 11 is secured to a supporting shaft 15 which is rotatably carried by a suitable bracket 23 on mounting structure 16 for unrestrained movement about an axis generally normal to the directivity axis of the antenna. Mounting structure 16 is intended to represent the platform such as an aircraft employed for carrying all of the radar components. A gear 17 on the free end 18 of shaft 15 engages gear 19 on an antenna drive motor 20 which is suitably carried on the radar platform. Operation of motor 20 by the application of an electrical potential through leads 21 effects rotation of antenna 11 for searching a sector of space circular in planform with the platform located at the center of the search pattern.

It should be understood that any type of antenna and antenna mounting structure may be employed in carrying out the teachings of this invention and that the particular arrangement shown and described herein is illustrative only.

In order to determine at any instant the azimuth aiming direction of antenna 11 a pickup 22 carried by platform 16 operatively engages gear 17 on antenna shaft 15 through gear 24 whereby the rotational position of shaft 25 on pickup 22 represents the rotational position of antenna 11 relative to established reference axes on the platform. Pickup 22 may be of the resolver type wherein two outputs 26 and 27 are obtained representing the sine and cosine functions of the rotational movement of the antenna.

The applied voltage for resolver pickup 22 is obtained by a saw-tooth sweep generator 28 which is triggered on by each transmitting pulse 5 from signal generator 4. The sweep voltage applied to resolver pickup 22 from sweep generator 28 rises linearly, starting with each transmitted pulse and ending at some predetermined later time before transmission of the next succeeding pulse representing the maximum range of the radar device. Thus, when the outputs 26 and 27 from resolver pickup 22 are applied to the horizontal and vertical plates 29 of a cathode ray tube 30, a beam deflecting magnetic field is generated within the tube which rotates in synchronism with the rotation of antenna 11 and its field strength increases linearly with time representing the range sweep of the transmitted energy.

The primary purpose of the basic radar unit is to provide an indication of the range and azimuth location of a remote object. To accomplish this function, cathode 31 of tube 30 is connected to a conventional range detection receiver 33 which produces the electron emitting voltage for cathode 31 in response to the receipt of return pulses reflected off a remote object located somewhere within the beam pattern of the transmitted energy. The cathode voltage obtained from the range detection receiver produces an image T of the remote object on the face of the tube, as illustrated in the drawing, wherein the position of the image is determined by the voltages applied to the vertical and horizontal deflection plates 29. The distance of the image T from the center of tube 30, will therefore represent the range of the remote object and the rotational position of the image T will represent the relative azimuth position of the remote object.

The return pulses producing the image T are picked up by antenna 11 and fed to duplexer 10 through conducting lead 12. Duplexer 10 effectively isolates the transmitting and receiving circuits of the radar device to prevent the transmitted pulses from affecting the range detection receiver and to prevent the return pulses from affecting the pulse signal generator and power amplifier. The return pulse output from duplexer 10 connects with a pre-amplifier 35 through lead 34. After amplification in pre-amplifier 35 the return pulses are applied to range detection receiver 33.

Obviously, a certain amount of stray energy will be picked up by the range detection receiver along with the return pulses. This stray energy or noise will appear on the face of tube 30 as a faint line 36, as indicated in the drawing. This line 36 will sweep around the face of the tube with the center of the tube as the apex at a rate equal to the sweep rate of the antenna and the appearance of a target image T will appear as a pip or concentration of energy on the line at a particular radial distance from the center of the tube, depending upon the range of the actual target which is reflecting the energy pulses being transmitted. While the basic radar unit 1 need not be of any particular type insofar as the detail circuitry is concerned, it is essential that it provide a reasonably accurate range measurement of the remote object, the altitude of which is to be determined by associated means hereinafter described. It is also essential that the basic radar unit include an antenna having directional characteristics such that the beam pattern of the transmitted energy is comparatively narrow in the azimuth or horizontal direction relative to the earth's surface since the azimuth position of the remote object is obtained by detecting the azimuth aiming position of the antenna in accordance with conventional practice.

Inasmuch as this invention utilizes the earth's surface as a secondary reflector, the best results are obtained with the equipment when the transmitted pulse energy is horizontally polarized. This is not considered necessary however, since reasonably high reflective efficiencies are also obtained from the earth's surface when using vertically polarized energy so long as the normal conditions are present wherein the incidence angle of the reflected energy is low.

As shown in FIGURE 3, the beam pattern 37 of the transmitted energy from antenna 11, while narrow in the azimuth direction, is sufficiently large in the elevation or vertical direction that a portion of the beam pattern is distorted by direct contact with the earth's surface. By bouncing a portion of the beam off the earth's surface each cycle of the radio frequency energy making up the transmitted pulses will be reinforced by a preceding radio frequency cycle and thereby greatly increasing the field strength. For example, if the reflective efficiency of the earth's surface is 100%, which is approximately correct for operations over water, the field strength of the transmitted energy near the earth's surface will be doubled, due to the addition of the reflected energy with the unreflected energy. Since the range varies directly with the field strength, by doubling the field strength the range is also doubled. This phenomenon is illustrated in FIGURE 3 wherein the basic beam pattern 37 is modified by the reflected energy from the earth's surface to produce a large number of secondary beams or fingers 38, reaching far out in range for detecting the presence of a remote object. As noted in the drawing, secondary beam patterns or fingers 38 develop about a foci 39 on the earth's surface located immediately below the radar antenna 11. The total number of these secondary beams which will be formed depends upon the pulse carrier frequency and upon the height of the antenna.

Figure 4:
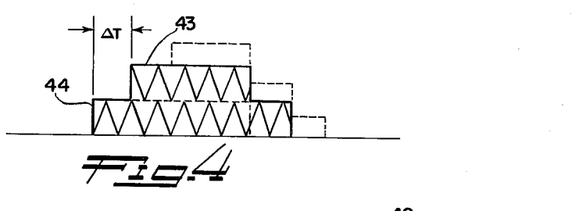
FIGURE 4 is a presentation of the reflected pulse pattern operated on by the radar device of FIGURE 1 for determining the height of a remote object.
Figure 5:
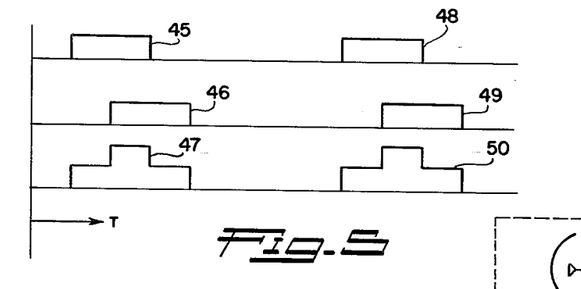
FIGURE 5 is a presentation illustrating the manner in which the pulse shapes of FIGURES 4 and 7 are formed.

By employing an antenna 11 having the directivity characteristics specified hereinabove wherein a beam pattern sufficiently wide that a portion of the free space beam will be distorted by reflections off the earth's surface, the energy reaching the remote object 42 may be reflected back to the radar antenna along two distinct paths. One path 40, as shown by construction lines in FIGURE 3, is a straight line-of-sight from the antenna to the object. The other path 41 is indirect and may be defined as that path which, using the earth's surface as a reflector, will intersect both radar antenna 11 and object 42. Because of these two paths the energy reflected by the remote object will not arrive at radar antenna 11 simultaneously but the energy traveling the indirect path will be delayed an amount which is proportional to the difference in the two path lengths. As a result, the return pulses will normally provide a pulse shape, substantially as shown in FIGURE 4, wherein the indirect reflected pulse 43 will combine with the direct reflected pulse 44 and thus produce a sharp change in the received energy level at a finite time $\Delta T$ when the indirect reflected pulse begins to add to the energy of the direct reflected pulse. The time sequence for this pulse strength build-up is illustrated in FIGURE 5 wherein pulse 45 represents the return pulse from the direct path, pulse 46 represents the pulse received from the indirect path at a finite later time, and pulse 47 represents the two pulses combined which produce the pulse shape shown in FIGURE 4. Pulses 48, 49 and 50 in FIGURE 5 illustrate return pulses produced by the transmitted pulse next following the transmitted pulse producing return pulses 45 and 46.

There are actually three separate return pulses which will be received by radar antenna 11 since there are three possible pulse path combinations, the return pulse which is detected later in time than the first two reflected pulses being produced entirely by reflections from the earth's surface. That is, none of the energy forming the third return pulse will have traveled the direct path route. Since it is the leading edge of the first two return pulses 43 and 44 which are operated upon to provide the object altitude determination, the third return pulse, which is shown in dotted lines in FIGURE 4, is of no practical significance in the specific system described herein. It should be understood however, that this third return pulse may be used rather than the second return pulse to make the height determination if desired without departing from the teachings of this invention. This alternative scheme may actually be the better when operating under extremely high noise level conditions.

The return pulses applied to pre-amplifier 35 in the basic radar unit are fed to a broad band height finding receiver 52 in the delta range detection unit 2 through lead 53. Height finding receiver 52 may be of any conventional type so long as its operating band width is sufficiently broad to receive both the first and second return pulses such as 43 and 44 in FIGURE 4. The output from height finding receiver 52 is a voltage, the level of which represents the envelope of the reflected pulses applied to the receiver. This output signal, the wave form of which is illustrated in FIGURE 1 at 54 is applied to the vertical plates 55 of a cathode ray tube 56 through lead 57. A sweep voltage is applied to the horizontal plates 58 of tube 56 and a fixed voltage is applied to cathode 59 by means of a suitable source of electrical potential 60 whereby the wave form of the return pulses applied to height finding receiver 52 are made to appear on the face 61 of tube 56.

The sweep voltage applied to the horizontal plates 58 of tube 56 is generated by a saw-tooth sweep generator 62. Control over the operation of sweep generator 62 is accomplished by feeding the pulses 5 from pulse signal generator 4 in the basic radar unit to a trigger circuit 63 which produces sharp trigger pulses the application of which to the sweep generator initiates the linearly rising voltage output of the sweep generator. Since generator 62 is triggered in response to the transmitted pulses of the basic radar unit it is necessary to employ a delay network 64 between the output of trigger circuit 63 and the control input of sweep generator 62 in order to have the sweep voltage applied to the horizontal plates substantially simultaneously with the application of the return pulse voltage from receiver 52 to the vertical plates 55. The required delay between transmission of a radio frequency pulse by the radar device and the initiation of a sweep voltage by sweep generator 62 varies with the range of the remote object. Therefore, delay network 64 is made variable. By simply changing the amount of delay introduced by delay network 64 the return pulses such as pulse 65 appearing on the face 61 of tube 56 may be shifted to the left or right depending upon whether the delay time is increased or decreased.

Figure 2:
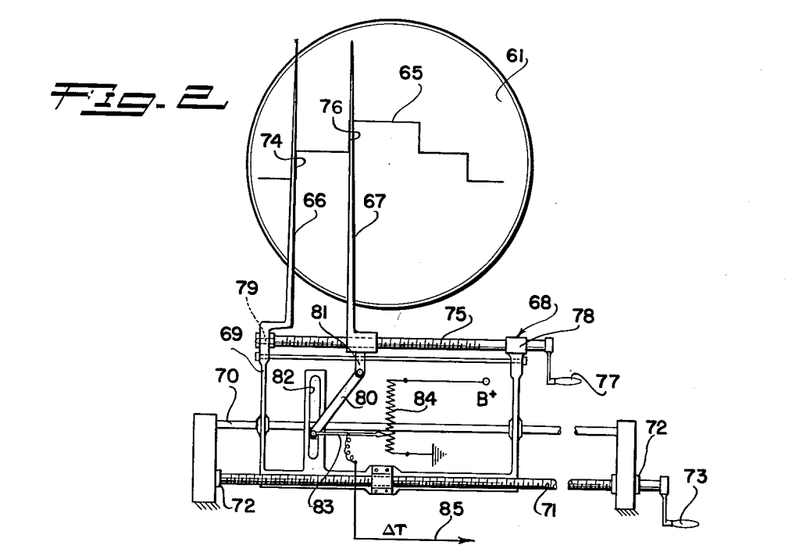
FIGURE 2 is a view of the mechanical pulse time difference measuring apparatus for use in the height finding device of FIGURE 1.

The magnitude of the displacement of the second return pulse 43 from the first return pulse 44 as illustrated in FIGURE 4 is proportional to the difference in path lengths of the transmitted energy as described above in connection with FIGURE 3. This displacement identified as $\Delta T$ in FIGURE 4 represents the output desired from the delta range detection unit 2 for determining the height of the remote object. In order to measure this displacement $\Delta T$ in terms of a voltage which is proportional to the displacement, a manually operable device such as that shown in FIGURE 2 may be employed wherein a pair of markers 66 and 67 are arranged adjacent and in front of face 61 of tube 56. By adjusting the spacing between markers 66 and 67 so that such spacing will equal the return pulse displacement $\Delta T$, an output voltage from a potentiometer 84 may be made to represent $\Delta T$. This mechanism 68 includes a frame 69 slidably carried on a shaft 70 suitably supported by the height finder platform 16 adjacent the face of the tube 56. A lead screw 71 supported by the platform structure through bearings 72 threadedly engages frame 69 whereby rotation of a crank 73 on lead screw 71 effectively causes frame 69 to move laterally and relative to the face of tube 56. Thus, marker 66 appearing at the front of tube 56 may be positioned to coincide with the leading edge 74 of the combination return pulse 65, marker 67 is carried on a second lead screw 75 so that rotation of the second lead screw will effectively move marker 67 relative to marker 66 such that it will coincide with the leading edge 76 of the second rise on combined return pulse 65. Rotation of the second lead screw 75 is effected by rotation of crank 77. Suitable bearings 78 and 79 on frame 69 support the second lead screw 75 and allow the required rotational movement thereof for properly positioning marker 67 relative to marker 66. A link 80 swingably carried at one end by a projection 81 on marker 67 and at its opposite end by a slotted bracket 82 operatively connects with a pickup arm 83 on a potentiometer 84 supported by frame 69. By applying a source of electrical potential to potentiometer 84, as illustrated in FIGURE 2, the voltage output at the pickup arm will be proportional to the spacing between markers 66 and 67 and independent of the lateral movement of frame 69. Thus to provide the $\Delta T$ output voltage the operator simply turns crank 73 until marker 66 coincides with the leading edge 74 of pulse 65 appearing on the face 61 of tube 56 and then turns crank 77 until marker 67 coincides with the leading edge 76 of pulse 65. This second leading edge 76 represents the receipt of the second return pulse 43 as described above in connection with FIGURES 4 and 5.

The ΔT voltage obtained from potentiometer 84 in the delta range detection unit 2 is applied to computer 3 through lead 85. The ΔT voltage, in combination with a voltage $R_s$ representing the measured range (slant range) of the remote object, and a voltage $h_1$ representing the altitude of the height finder radar platform 16, provides the necessary information for computing the altitude of the remote object. These three voltage inputs to the computer are operated on to provide a solution to the following equation:

$$h_2 \cong \frac{\Delta T R_s}{2h_1} \quad (1)$$

Where $h_1$ is equal to the altitude of the height finder platform 16; $R_s$ is equal to the slant range of the object relative to the height finder as measured by the basic radar unit shown in FIGURE 1; ΔT is equal to the difference in length between the direct and indirect energy paths 40 and 41; and $h_2$ is equal to the unknown quantity or altitude of the remote object under observation.

Figure 8:
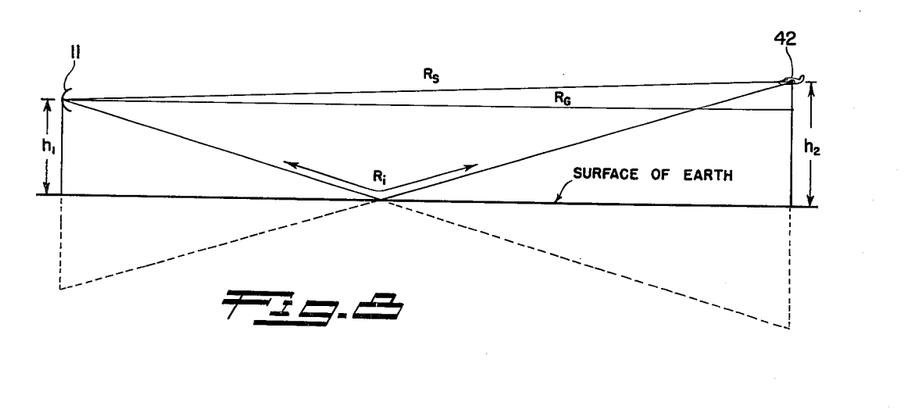
FIGURE 8 is a geometrical diagram illustrating the basic principles employed by the height finding device.

A derivation of Equation 1 may be made from the geometrical presentation illustrated in FIGURE 8. From the geometry of FIGURE 8 the following relationships may be obtained: Wherein $R_i - R_s$ is equal to ΔT and $R_g$ is equal to the distance between the height finder and the object as measured parallel to the surface of the earth, $$R_s^2 - (h_2 - h_1)^2 = R_g^2 \quad (2)$$

and $$(h_2 + h_1)^2 + R_g^2 = R_i^2 \quad (3)$$

By expanding Equations 2 and 3 and substituting Equation 2 for $R_g^2$ in Equation 3, the following relationship is obtained:

$$4h_1 h_2 = R_i^2 - R_s^2 \quad (4)$$

By expanding $R_i^2 - R_s^2$ in Equation 4, it may be rewritten as follows:

$$\frac{4h_1 h_2}{R_i + R_s} = R_i - R_s \quad (5)$$

Where $h_1$ and $h_2$ are small as compared with $R_s$ and $R_i$, which is the practical situation, the quantity $R_i + R_s$ is substantially equal to $2R_s$. Therefore, substituting $2R_s$ for $R_i + R_s$ in Equation 5, the following equation may be written:

$$\Delta T = R_i - R_s \cong \frac{2h_1 h_2}{R_s} \quad (6)$$

By rearranging Equation 6 to provide a solution for $h_2$, Equation 1 is obtained.

Mechanization of Equation 1 is accomplished by computer 3 as shown in FIGURE 1 wherein the ΔT voltage and the $R_s$ voltage are applied to a multiplier 86 to provide an output representing $\Delta T(R_s)$. The $\Delta T R_s$ output of the multiplier is applied to a feedback amplifier 87 for driving a servo motor 88, the output shaft 89 of motor 88 positions a potentiometer pickup arm 90 on potentiometer 91 to provide an output from potentiometer 91 which is applied to feedback amplifier 87 through lead 92, effecting a division of the $\Delta T R_s$ quantity by the quantity $2h_1$. The voltage representing $h_1$ is developed by a suitable altimeter 51 on the height finding platform and is applied to potentiometer 91 through lead 93. The factor of 2 in the denominator of Equation 1 may be obtained by doubling the gain of the $h_1$ output from altimeter 51.

The slant range $R_s$ applied to multiplier 86 is obtained at the pick-off arm 94 of a range potentiometer 95 connecting with a suitable source of electrical potential identified as B+.

Pick-off arm 94 on potentiometer 95 may be positioned manually, as illustrated in FIGURE 1, by connecting the pick-off arm with a range meter 96 wherein the range meter is provided with a hand crank 97 for setting the range meter to correspond with the range of the detected object or target as measured on the face of cathode ray tube 30 of the basic radar unit 1.

The rotational position of output shaft 89 on servo motor 88 in computer 3 represents the solution for the altitude of the remote object being detected by the height finder device. By simply driving the indicator arm 98 of a target altitude meter 99 with servo motor shaft 89, the altitude of the remote object may be read directly from the meter.

The use of the earth's surface as a reflector of the electromagnetic energy transmitted through antenna 11 of the device shown in FIGURE 1 produces some undesirable beam pattern characteristics. The secondary beam patterns on fingers 38, shown in FIGURE 4, separate near the outer ends 101 to provide "dead" channels 117 along which a moving object, such as an aircraft, may be able to travel without detection, since these fingers 38 are substantially stationary fronts when employing a fixed frequency pulse signal generator as described in connection with FIGURE 1. These "dead" channels between the plurality of fingers 38 may however be effectively eliminated by frequency modulating the carrier wave of the transmitted pulses. The effect on the beam pattern by frequency modulating the pulse signal carrier wave in the signal generator is to move the secondary beams or fingers 38 continuously, making it impossible, for all practical purposes, for an object within the range of the height finding radar beam to avoid detection.

Figure 6:
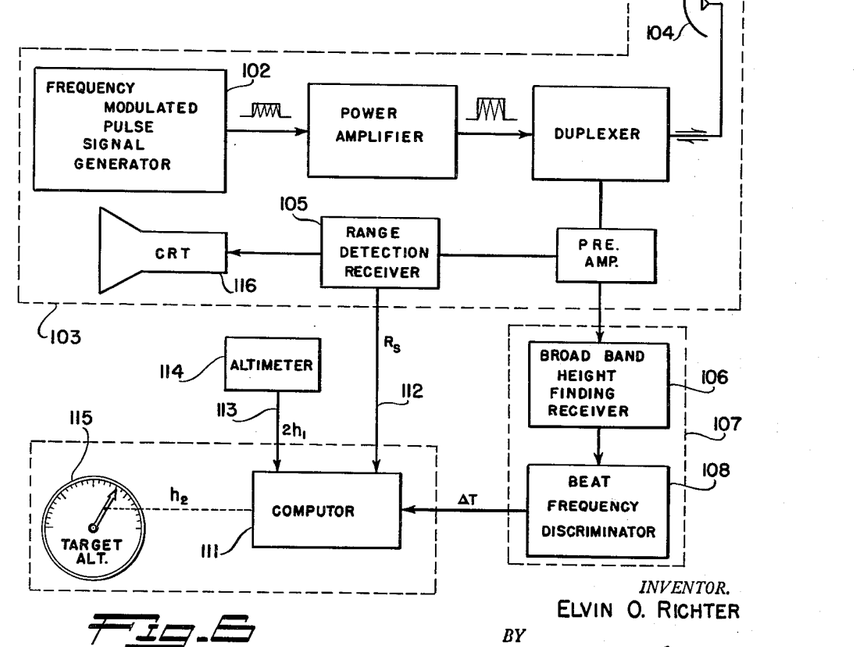
FIGURE 6 is a block diagram of a modified form of the height finding radar device shown in FIGURE 1.
Figure 7:
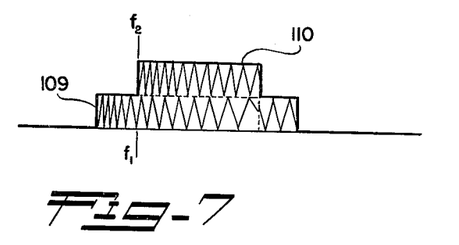
FIGURE 7 is a presentation of the reflected pulse pattern operated on by the height finding device of FIGURE 6 for determining the height of a remote object.

FIGURE 6 shows a height finding radar incorporating a frequency modulated pulse signal generator 102 in lieu of the fixed frequency pulse signal generator employed in the arrangement shown in FIGURE 1. The basic radar unit 103 of FIGURE 6 may be otherwise the same as the arrangement of FIGURE 1. The frequency modulated pulses reflected by a remote object and received by antenna 104 are applied to a range detection receiver 105 in the basic radar unit and to a broad band height finding receiver 106 in the delta range detection unit 107. The output from receiver 106 is applied to a beat frequency discriminator 108 which may be of any of several conventional types suitable for this purpose. Discriminator 108 detects a beat frequency between the first return pulse 109 and the second return pulse 110, as illustrated in FIGURE 7, to provide an output voltage representing ΔT which is proportional to the difference in the lengths of energy paths 40 and 41, as illustrated in FIGURE 3. The ΔT output from beat frequency discriminator 108 is applied to computer 111 which also receives a voltage proportional to the range of the remote object through lead 112 and a voltage proportional to the altitude of the height finding radar device through lead 113. The range measurement $R_s$ may be obtained from the range detection receiver 105 directly or by using a separate range meter as described in connection with FIGURE 1. The altitude $h_1$ may be obtained from an altimeter 114, also as indicated in FIGURE 1. The output shaft of computer 11, like the output shaft 89 in computer 3 of FIGURE 1, may be operatively connected to a target altitude meter 115 to provide a direct reading of the remote target altitude.

The cathode ray tube 116 in the basic radar unit 103 may be utilized to provide the desired azimuth information for fixing the location of a remote object in the same manner as was described in connection with FIGURE 1.

By frequency modulating the pulse energy of the basic radar unit, not only are the possibilities of the remote object being able to avoid detection eliminated due to the motion of fingers 38, but also the use of a beat frequency discriminator is made possible for automatically obtaining the ΔT output voltage required by the computer. Thus, the use of tube 56 and the marker mechanism 68 may be eliminated.

In operation, the height finding radar device of FIG-

URE 1 transmits electromagnetic energy pulses through antenna 11 to produce a beam pattern substantially as shown in FIGURE 3. An object, such as 42, within the energy beam will reflect the transmitted energy pulses, some of which energy will be received by antenna 11 from both a direct path and an indirect path using the earth's surface as a reflector. The return pulse energy is compared with the transmitted pulse energy in basic radar unit 1 to provide a reading of the range of the remote object. The return pulse energy represented by combining the energy traveling along the direct and indirect paths is analyzed in the delta range detection unit 2 to provide a ΔT output representing the difference in length between the direct and indirect paths. Range information from the basic radar unit and altitude information from an altimeter on the height finding platform are combined in computer 3 with the ΔT output to provide an accurate determination of the altitude of the remote object.

The height finding radar device may also serve as a wide coverage search radar by rotating the antenna 11 in a cyclical manner. In the configuration of FIGURE 1, antenna 11 rotates through 360° to search a circular sector of space with the antenna being at the center of the sector. Thus with a radar range of say, 200 miles and a beam height of 100,000 feet, a vast space 100,000 feet high and 400 miles wide in all directions parallel to the earth's surface may be investigated by the radar device.

With a sweep rate for the antenna, for example, of 1 cycle per second, an object within the search area will be contacted only once each second thus making it difficult for the object to discover the fact that it is under surveillance. By employing a phosphorescent coating on the face of the cathode ray tube, having the proper persistence value, range and azimuth information of all remote objects within the field of search may be presented to the operator at all times for performing the operations necessary to determine the height of each such object with a high degree of accuracy and reliability with even lower antenna sweep rates.

While the azimuth information provided by the basic radar unit of FIGURE 1 is obtained in the conventional manner and hence will be subject to errors comparable with conventional radar equipment, this is not considered to be a material limitation on the utility of the height finder for long range operations since an accurate height determination of the object is by far the most important aspect of the problem. By knowing the height of a remote object with reasonable accuracy, short range reconnaissance or attack aircraft will be able to locate the object for a closeup investigation with high degree of reliability using conventional radar equipment even though the azimuth position information is somewhat in error. On the other hand, if the height of the remote object is not known with reasonable accuracy, investigative aircraft will most likely never be able to locate the object.

The operation of the height finding device of FIGURE 6 is the same as that described for the device of FIGURE 1 except for the fact that the manual operations necessary in the FIGURE 1 device for obtaining the ΔT computer information is accomplished automatically by use of a beat frequency discriminator 108.

Since the height determination described hereinabove is based on the earth's reflecting surface being flat, a small error in the altitude in formation will appear at long ranges. A correction for the earth's curvature should therefore be made to the altitude reading obtained at meters 99 or 115. This may be done in any of a number of ways such as either by the use of a chart or automatically in the computer by modifying the range voltage input $R_s$. A suitable arrangement for the automatic correction may employ a potentiometer 118 which is connected to pick-off 94 on range potentiometer 95. The voltage output of potentiometer 118 is applied directly to multiplier 86 through pick-off 119 as shown in FIGURE 1 and is positioned by the drive mechanism 120 operated manually from crank 97.

Should a situation be presented where a plurality of objects are detected by the height finding device at substantially the same range but different azimuth locations, it may be impossible, as a practical matter, to differentiate between the reflected pulses so as to obtain an object altitude reading which corresponds to a particular one of the objects. Where this occurs, though for normal operation such is highly improbable, it will be necessary to interrupt the search function of the device by stopping the rotation of the antenna and aiming the energy beam in azimuth toward each object long enough to obtain its altitude.

While the foregoing description calls for a beam pattern sufficiently large in the direction normal to the earth's surface so that a portion of the beam will strike the earth, it should be noted that the device will function to provide a height determination without causing the transmitted energy to be reflected off the earth's surface. All that is necessary is that the energy reflected by the remote object be received from the indirect path using the earth's surface as a reflector as well as from a direct line of sight path. This may be accomplished using a more highly directive transmitting antenna and employing a receiving antenna having the wide angle directional properties described above. This would of course reduce the energy level of the reflected energy and thus reduce the operating range of the height finder. Such an arrangement is therefore not considered to be as desirable for most applications of the device as the configuration described in connection with FIGURES 1 and 6, although it is clearly within the teachings of this invention.

The use of a signal generator in the basic radar unit of the continuous wave type as opposed to the pulse type is considered to be an obvious substitution of components which is anticipated by this disclosure.

It is to be understood that certain alterations, modifications and substitutions in addition to those suggested hereinabove may be made to the instant disclosure without departing from the spirit and scope of the invention as defined by the appended claims.

I claim:

1. A radar device for determining the altitude of a remote object comprising, antenna means, transmitting means for directing electromagnetic energy through said antenna means and toward the remote object, receiving means connecting with said antenna means and being responsive to the electromagnetic energy reflected by the remote object from two energy paths, one path being on a direct line of sight between the antenna means and the remote object and the other path being indirect from the object to the antenna means via a reflection off the surface of the earth, detector means coupled with said receiver means and measuring the time difference in receipt of the energy from the two paths, means responsive to both the transmitted and received energy and providing an output representing the range of the remote object, and means responsive to the output from said detector means and said last mentioned means for determining the height of the remote object.

2. A height finding radar device comprising, a platform suspended in air at a known height above the earth's surface, a transmitting device carried on said platform and radiating electromagnetic energy, receiving means carried on said platform and receiving energy reflected from a distant object along a direct line of sight path and along an indirect path utilizing the earth as a reflector, detector means carried on said platform and connecting with said receiving means and detecting the time difference between the received direct and indirect reflected energy, means responsive to both said transmitting device and said receiving means and providing an output representing the range of the object relative to the platform, and object altitude measuring means connecting with the last two mentioned means and providing an output representing the height of the distance object above the earth's surface.

3. A radar device for locating remote objects comprising, a signal generator providing a radio frequency output signal, antenna means connecting with said generator and directing the radio frequency energy into space and forming a beam pattern for the energy which is narrow in a direction generally parallel with the earth's surface and wide in a direction generally normal to the earth's surface whereby a portion of the energy beam will always intersect the earth's surface, means effecting rotation of said antenna means about an axis generally normal to the earth's surface whereby a large sector of space may be systematically covered by the energy beam, receiver means connecting with said antenna means and being responsive to energy reflected by a remote object along a direct path between the antenna means and the remote object to produce an output signal, indicator means responsive to the instantaneous angular position of the antenna means and to the output signal from the receiver means and to the radio frequency output signal to provide azimuth and range readings of the remote object, a second receiver means connecting with the antenna means and being responsive to energy reflected by said remote object from two distinct paths to provide an output signal, one path being direct between the antenna means and the remote object and the other path being indirect via the earth's surface as a reflector, a saw-tooth voltage generator responsive to the output from said signal generator and providing a linearly varying output voltage, a cathode ray tube indicator responsive to the output from said saw-tooth generator and from said second receiver means for producing a visual display of the output signal from said second receiver means, means associated with said cathode ray tube display and producing a displacement voltage representing the difference between the direct and indirect path lengths, altimeter means providing a voltage representing the altitude of said antenna means, a range potentiometer providing an output voltage representing the range of the remote object in accordance with the range reading obtained using the first mentioned indicator means, and computer means responsive to the displacement voltage, the range voltage and the altitude voltage for automatically indicating the altitude of the remote object.

4. A radar device for locating remote objects comprising, a signal generator providing a radio frequency output signal, antenna means connecting with said generator and directing the radio frequency energy into space and forming a beam pattern for energy which is narrow in one plane and wide in a second plane generally normal to said one plane, means effecting swinging movement of said antenna means about an axis generally parallel to said second plane whereby a large sector of space may be systematically covered by the energy beam, range detection receiver means connecting with said antenna means and being responsive to energy reflected by a remote object along a direct path between the antenna means and the remote object to produce an output voltage representing the range of the remote object, a second receiver means connecting with said antenna means and being responsive to energy reflected by said remote object from two distinct paths, one path being direct between the antenna means and the remote object and the other path being indirect via the earth's surface as a second reflector, the output from said second receiver means being a voltage representing the difference between the direct and indirect path lengths, altimeter means providing an output voltage representing the altitude of the antenna means, and a computer responsive to the range, altitude and path length difference voltages for providing an indication of the object altitude, said computer including altitude correction means compensating for the earth's curvature.

5. A radar device for locating remote objects comprising, a signal generator providing a radio frequency output signal, antenna means connecting with said generator and directing the radio frequency energy into space and forming a beam pattern for the energy which is narrow in one plane and wide in a second plane generally normal to said one plane, means effecting swinging movement of said antenna means about an axis generally parallel to said second plane whereby a large sector of space may be systematically covered by the energy beam, range detection receiver means connecting with said antenna means and being responsive to energy reflected by a remote object along a direct path between the antenna means and the remote object to produce an output voltage representing the range of the remote object, a delta range detection receiver means connecting with said antenna means and being responsive to energy reflected by said remote object from two distinct paths, one path being direct between the antenna means and the remote object and the other path being indirect via the earth's surface as a second reflector, the output from said delta range detection receiver means being a voltage representing the difference between the direct and indirect path lengths, altimeter means providing an output voltage representing the altitude of the antenna means, and computer means responsive to the range, altitude and path length difference voltage for providing an indication of the object altitude.

6. A radar device for locating remote objects comprising, a signal generator providing a frequency modulated radio frequency output signal, antenna means connecting with said generator and directing the radio frequency energy into space and forming a beam pattern for the energy which is narrow in one plane and wide in a second plane generally normal to said one plane, means effecting swinging movement of said antenna means about an axis generally parallel to said second plane whereby a large sector of space may be systematically covered by the energy beam, receiver means connecting with said antenna means and being responsive to energy reflected by a remote object within the beam pattern to produce an output voltage representing the range of the remote object, a broad band height finding receiver connecting with said antenna means and being responsive to energy reflected by said remote object and traveling along two distinct paths, one path being direct between the antenna means and the remote object and the other path being indirect via the earth's surface as a second reflector, a beat frequency discriminator connecting with said height finding receiver and being responsive to the output therefrom to provide a voltage representing the difference frequency between the received energy from the direct and indirect paths, altimeter means providing an output voltage representing the altitude of the antenna means, and computer means responsive to the range, altitude and beat frequency voltages for providing an indication of the object altitude.

7. A radar device for locating remote objects comprising, a fixed frequency signal generator providing a radio frequency output signal, antenna means connecting with said generator and directing the radio frequency energy into space and forming a beam pattern for the energy which is narrow in one plane and wide in a second plane generally normal to said one plane, means effecting swinging movement of said antenna means about an axis generally parallel to said second plane whereby a large sector of space may be systematically covered by the energy beam, receiver means connecting with said antenna means and being responsive to energy reflected by the remote object along a direct path between the antenna means and the remote object to produce an output voltage representing the range of the remote object, a broad band height finding receiver connecting with said antenna means and being responsive to energy reflected by said remote object and traveling two distinct paths, one path being direct between the antenna means and the remote object and the other path being indirect via the earth's surface as a second reflector, means connecting with the output of said broad band height finding receiver and providing a voltage representing the time difference between the receipt of energy from the direct and indirect paths, altimeter means providing an output voltage representing the altitude of the antenna means, and computer means responsive to the range, altitude and time difference voltages for providing an indication of the object altitude.

8. A radar device for locating remote objects comprising, a signal generator providing a radio frequency output signal, antenna means connecting with said generator and directing the radio frequency energy into space and forming a beam pattern for the energy which is narrow in at least one plane, range detection receiver means connecting with said antenna means and with said signal generator and being responsive to energy reflected by a remote object within the beam pattern and to the transmitted energy to provide an output representing the range of the remote object, delta range detection means connecting with said antenna means and being responsive to energy reflected by said remote object from two distinct paths, one path being direct between the antenna means and the remote object and the other path being indirect via the earth's surface as a second reflector, the output from said delta range detection means representing the difference between the direct and indirect path lengths, altimeter means providing an output representing the altitude of the antenna means, and computer means responsive to the range altitude and path length difference outputs for providing an indication of the object altitude.

9. A radar device for locating remote objects comprising, a signal generator providing a radio frequency output signal, antenna means connecting with said generator and directing the radio frequency energy into space and forming a beam pattern for the energy which is narrow in at least one plane, range receiver means connecting with said antenna means and said signal generator and being responsive to energy reflected by a remote object and to the transmitted energy to produce an output representing both the relative range and azimuth position of the remote object, delta range detection means connecting with said antenna means and being responsive to energy reflected by said remote object which travels along two distinct paths, one path being direct between the antenna means and the remote object and the other path being indirect via the earth's surface as a reflector, the output from said delta range detection means representing the difference between the direct and indirect path lengths, and means determining the altitude of the remote object from the outputs of said delta range detection means and said range receiver means.

10. A device for accurately measuring the altitude of a remote object comprising, a signal generator producing radiant energy, energy transmitting means connecting with said signal generator for directing said energy to the remote object, receiving means detecting the transmitted energy reflected by said object, range measuring means connecting with said transmitting and receiving means and providing an output representing the relative range of the remote object in response to detection of the reflected energy, delta range detection means connecting with said receiving means and being responsive to the reflected energy traveling along two distinct paths to provide a path length difference output, one of said paths being direct between the remote object and the energy transmitting and receiving means and the other path being indirect via the earth's surface as a reflector, the output from said delta range detection means representing the difference between the direct and indirect path lengths, and means providing an indication of the altitude of the remote object in accordance with the range and path length difference outputs.

References Cited in the file of this patent

UNITED STATES PATENTS 2,659,882     Barret _________________ Nov. 17, 1953

FOREIGN PATENTS 588,763     Great Britain ____________ June 3, 1947